United States Patent Office.

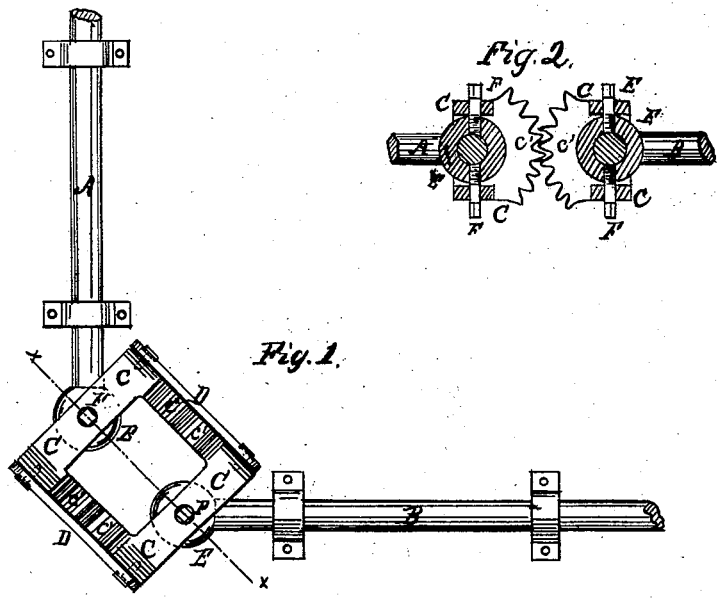

JOHN M. CASE, OF ATHENS, OHIO.

Letters Patent No. 75,364, dated March 10, 1868.

IMPROVEMENT IN ANGULAR SHAFT-COUPLING.

*The Schedule referred to in these Letters Patent and making part of the same.*

TO ALL WHOM IT MAY CONCERN:

Be it known that I, JOHN M. CASE, of Athens, in the county of Athens, and State of Ohio, have invented a new and useful Improvement in Angular Shaft-Coupling; and I do hereby declare that the following is a full, clear, and exact description thereof, which will enable others skilled in the art to make and use the same, reference being had to the accompanying drawings, forming part of this specification.

Figure 1 is a top view of two shafts connected by my improved coupling.

Figure 2 is a detail sectional view of the same, taken through the line $x\ x$, fig. 1.

Similar letters of reference indicate corresponding parts.

My invention has for its object to furnish an improved coupling or gearing for connecting shafts to each other at any desired angle, which shall be so constructed and arranged as to securely couple the shafts, run with less noise and with less friction than the ordinary bevel-gearing, and which shall, at the same time, require less material for its construction; and it consists in the combination of the oblong frames, having cogs or teeth formed upon the ends of their forward sides, and the pivoted connecting-bars, with each other, and with the adjacent ends of the shafts, as hereinafter more fully described.

A and B represent the shafts to be coupled. C are the coupling-frames, which are made of an oblong form. $c'$ are segments of cog or gear-wheels, which are formed solidly upon or are securely attached to the forward side of the frames C at their ends, as shown in figs. 1 and 2. The frames are connected to and held in gear with each other by the bars D, the ends of which are pivoted to the ends of the said frames, as shown in the drawings. By this construction the teeth formed upon the said frames C will be always in gear with each other, into whatever position the said frames may be turned. E are balls, into or through which the ends of the shafts A and B pass, and which are secured to the said shafts, to furnish secure and convenient bearings for the frame C. F are set-screws, which pass through holes in the sides of the frames C, and are screwed into the opposite sides of the balls E, so that their inner ends may press against the opposite sides of the ends of the shafts A and B, as shown in figs. 1 and 2, the outer or projecting parts of the said screws forming the pivoting-pins, upon which the said frames C work. By this construction the shafts may be coupled at any desired angle, and, the pressure being equally divided between the cogs or teeth upon the two ends of the frames C, said frames and teeth need not be made so strong, and consequently do not require so much material for their construction, as otherwise would be the case.

I claim as new, and desire to secure by Letters Patent—

The combination of the oblong frames C, having cogs or teeth, $c'$, formed upon the ends of their forward sides, and the pivoted connecting-bars D, with each other, and with the ends of the connected or coupled shafts, substantially as herein shown and described, and for the purpose set forth.

JOHN M. CASE.

Witnesses:
 HENRY T. BROWN,
 H. J. SOPKY.